United States Patent Office.

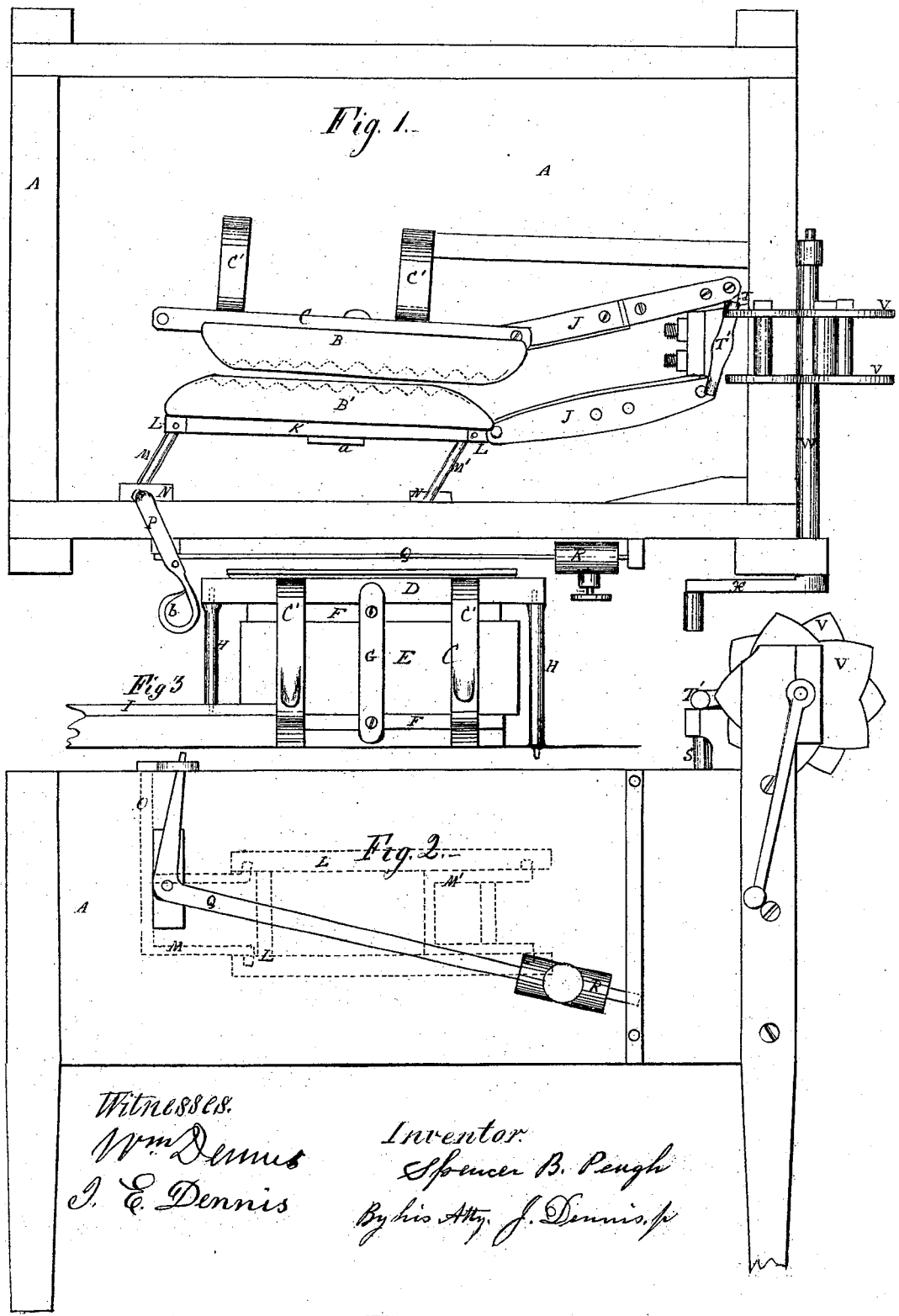

SPENCER B. PEUGH, OF SALEM, INDIANA.

Letters Patent No. 102,705, dated May 3, 1870.

IMPROVED WASHING-MACHINE.

The Schedule referred to in these Letters Patent and making part of the same

---

To all whom it may concern:

Be it known that I, SPENCER B. PEUGH, of Salem, Washington county, in the State of Indiana, have invented certain new and useful Improvements in Washing-Machines; and I hereby declare the following to be a full and exact description thereof, reference being had to the accompanying drawings forming part of this specification.

The nature or essence of my invention consists in applying to the washing-machine, for which a patent was issued to me April 13, 1869, certain improvements in the construction, and particularly in the operating mechanism, as will be fully set forth below.

In the drawing hereinbefore mentioned—

Figure 1 is a top view;

Figure 2, a front elevation; and

Figure 3, a back view of the fixed frame supporting or holding one of the vibrating rubbers.

The box or tub A holds the wash-water, and has the operating machinery connected to it, and within it are arranged, in a vertical position, the two rubbers or vibrating wash-boards B and B', the ridges on their contiguous faces, beneath the cap-pieces, being indicated in fig. 1 by dotted lines.

The rubber B is supported by the frame C, (shown in fig. 3,) consisting of the fixed standards C', fastened to the bottom of the tub, the top-bar D, and the board E; and the sliding bars F, which are fastened on the back of the rubber B, are connected by the cross-piece G, and traverse in the frame.

The rubber B' has upon its back sliding bars K, corresponding to the bars F on B, and between these bars a frame, L, which holds the rubber against the rubber B, and at the same time allows it to vibrate horizontally.

The frame L, (shown more fully in dotted lines in fig. 2,) is supported by the links or double cranks M and M', pivoted at their ends in the upper and lower bars of the frame L, while their middle parts turn in brackets N, fastened to the side of the tub.

From the crank M projects upward the shaft O, on the top of which is an arm, P, operated by the bent lever Q, pivoted upon the side of the tub, and acted upon by the adjustable weight R. This weight evidently tends to turn the crank M, but as M and M' are both pivoted in the same frame L, and must both turn together, the weight R will cause the frame L to press the rubber B' toward the rubber B, and this pressure may be adjusted or varied by moving the weight toward or from the pivot or fulcrum of the lever Q.

The links or connecting-bars J are pivoted at one end to the rubbers B and B', their opposite ends being pivoted respectively to the two ends of a cross-bar, T, on the bottom of the shaft S, and the cross-bar T', on the top of the same shaft, is acted upon by the cam-wheels V, on the shaft W, which may be turned by the crank X, or by such other device as circumstances may render eligible.

The two cam-wheels V are arranged relatively to each other, as shown, so that they will act on the two ends of the cross-bar T' alternately, and vibrate or rock the shaft S, and through the cross-bar T, and links J, communicate to the rubbers B and B' an alternating vibratory motion.

H and H' are vertical rollers, their upper ends turning in the bar D, and the lower end of H in the bottom of the tub, and that of H' in the platform I, the edge of which is shown in fig. 3, but which is omitted in fig. 1, to show the machinery which it covers.

The rubber B' is held to the frame L by plates a, fastened upon the bars K, and projecting over the rails or bars of the frame, and by means of the handle b, on the end of the arm P, the frame and rubber may be drawn back together to receive the articles to be washed, which may be drawn in between the rubbers and passed out around the rollers H and H', these rollers facilitating the moving of the wash, and at the same time saving wear.

What I claim, and desire to secure by Letters Patent, is—

1. The combination, with the rubbers B and B', of the fixed frame C and the swinging frame L, between which the said rubbers vibrate horizontally, substantially as described.

2. In combination with the rubbers B and B', the links J, cross-bars T and T' on the shaft S, and the cams V on the shaft W, arranged to vibrate the rubbers, substantially as specified.

3. The combination, with the frame L, of the cranks M and M', shaft O, arm P, bent lever Q, and adjustable weight R, arranged to operate substantially as and for the purpose set forth.

4. The combination, with the rubbers B and B', of the rollers H and H', substantially as and for the purpose specified.

SPENCER B. PEUGH.

Witnesses:
 HIRAM HICKS,
 D. W. C. THOMAS.